United States Patent
Ali et al.

(10) Patent No.: US 8,783,149 B2
(45) Date of Patent: Jul. 22, 2014

(54) COIL CUTTING TOOL AND METHOD

(75) Inventors: Syed Wajahat Ali, Brooklyn, NY (US); John Matthew Sassatelli, Valley Falls, NY (US); Andrew John Tomko, Glenville, NY (US)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 13/079,132

(22) Filed: Apr. 4, 2011

(65) Prior Publication Data

US 2012/0246944 A1   Oct. 4, 2012

(51) Int. Cl.
*B26D 1/08* (2006.01)

(52) U.S. Cl.
USPC .................. 83/563; 83/613; 83/639.1

(58) Field of Classification Search
CPC .... B21F 11/00; A01G 23/087; A01G 23/083; B26D 1/08; B26D 1/20
USPC .......... 83/563, 694, 639.1, 613, 210
See application file for complete search history.

(56) References Cited

U.S. PATENT DOCUMENTS

| | | | | |
|---|---|---|---|---|
| 3,482,613 A | * | 12/1969 | Bertram | 144/34.5 |
| 3,533,458 A | * | 10/1970 | McColl | 144/337 |
| 3,707,895 A | * | 1/1973 | McElderry | 83/623 |
| 4,463,496 A | | 8/1984 | Reich et al. | |
| 5,413,086 A | * | 5/1995 | Trudeau | 125/23.01 |
| 7,243,646 B2 | * | 7/2007 | Todack | 125/23.01 |
| 7,351,010 B1 | * | 4/2008 | Kelly et al. | 405/158 |
| 2008/0282857 A1 | | 11/2008 | Khoury et al. | |

FOREIGN PATENT DOCUMENTS

| | | |
|---|---|---|
| GB | 931193 A | 7/1963 |
| GB | 1331939 A | 9/1973 |
| GB | 2464342 A | 4/2010 |

OTHER PUBLICATIONS

Enerpac Hydraulic Technology Worldwide, "Hydraulic Cutterheads," 1 page, 2011, retrieved from: http://www.enerpac.com/en-US/products/specialty-tools/whc-and-whr-series-hydraulic-cutter-heads-0.
Search Report and Written Opinion from EP Application No. 12162226.0 dated Jul. 24, 2012.

* cited by examiner

*Primary Examiner* — Sean Michalski
(74) *Attorney, Agent, or Firm* — Hoffman Warnick LLC; Ernest G. Cusick

(57) ABSTRACT

A tool and a method are disclosed for cutting coils in a dynamoelectric machine. In an embodiment, the tool includes a blade having a cutting edge on a distal end thereof. The blade is operably connected on a proximal end thereof to a double acting hydraulic cylinder. The tool further includes at least one guide arm coupled to and extending longitudinally in a distal direction from the double acting hydraulic cylinder, wherein the at least one guide arm is disposed alongside the blade and extends parallel to a path of the blade.

9 Claims, 2 Drawing Sheets

COIL CUTTING TOOL AND METHOD

BACKGROUND OF THE INVENTION

The invention relates generally to coils such as end windings of machines such as AC motors, generators, and transformer coils. More particularly, the invention relates to a tool and a method for cutting coils such as end windings to facilitate removal for repair and maintenance.

Dynamoelectric machines such as electric generators and motors include a rotor and a stator. Rotors are generally constructed from a steel forging and include a number of slots that run the length of the rotor. Rotors are electrically wound by placing conductors referred to as rotor windings into the slots of the rotor. Stators are generally constructed from a number of stacked, metal laminations. Stators also include slots, which run the length of the stator, and are electrically wound by placing conductors known as stator coils into the slots of the stator.

In response to wear, stator coils must be removed from the stator and replaced periodically. Such removal has been accomplished by cutting end windings using a reciprocating saw, and removing the cut coil ends. Cutting the end windings with a reciprocating saw generates dust which contaminates the environment and creates environmental, health, and safety concerns. Additionally, in cases in which coils are insulated using asbestos insulation, the use of a reciprocating saw and the resultant dust may be particularly problematic. It also causes operator fatigue, which carries a risk of operator injury. Additionally, this method is often time consuming, as the end windings must be cut individually. This situation contributes to increased down time for the machine, and therefore added cost. End windings have also been cut using a scissor-action cutter, which is impractical when coils are located in narrow slots or spaces, leaving no room for a scissor-action cutter to operate.

BRIEF DESCRIPTION OF THE INVENTION

A first aspect of the disclosure provides a tool comprising a blade having a cutting edge on a distal end thereof; a double acting hydraulic cylinder operably connected to a proximal end of the blade; and at least one guide arm connected to and extending longitudinally in a distal direction from the double acting hydraulic cylinder, wherein the at least one guide arm is disposed alongside the blade and extends parallel to a path of the blade.

A second aspect of the disclosure provides a method of cutting a pair of coils. The method includes providing a tool including a blade having a cutting edge on a distal end thereof, a double acting hydraulic cylinder operably connected to a proximal end of the blade, and a pair of guide arms connected to and extending longitudinally in a distal direction from the double acting hydraulic cylinder. The at least one guide arm is disposed alongside the blade and extends parallel to a path of the blade. The tool is placed such that the pair of coils are captured between the pair of guide arms, and a pin member is inserted through a hole in a distal end of each arm in the pair of guide arms such that the pair of coils are captured between the pin member and the blade. The method further includes engaging the double acting hydraulic cylinder; retracting the blade; and removing the pin member.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with an electric machine. Although embodiments of the invention are described relative to an electric machine in the form of an A/C motor, it is understood that the teachings are equally applicable to other electric machines including, but not limited to, generators, transformers, and other machines having coils. Further, at least one embodiment of the present invention is described below in reference to a nominal size and including a set of nominal dimensions. However, it should be apparent to those skilled in the art that embodiments of the present invention are likewise applicable to any suitable motor, generator, and/or other machine. Further, it should be apparent to those skilled in the art that the present invention is likewise applicable to various scales of the nominal size and/or nominal dimensions.

As indicated above, aspects of the invention provide a tool and a method for cutting coils such as end windings of a dynamoelectric or electric machine.

Figure 1:
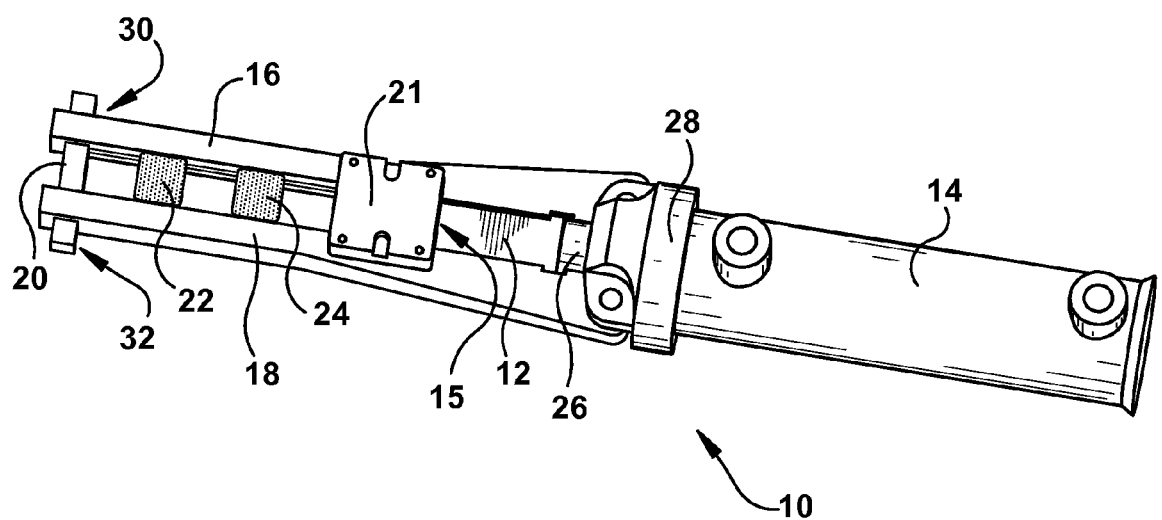
FIG. 1 shows a tool in accordance with an embodiment of the invention.

As shown in FIG. 1, tool 10 includes a blade 12 having a sharp cutting edge 15 on a distal end thereof. A proximal end of blade 12 is operably connected to a double acting hydraulic cylinder 14. In one embodiment, the double acting cylinder may have a stroke length of about 15.24 cm (about 6 inches) and may deliver a pressure of about 20.68 mPa (about 3,000 psi). At least one guide arm 16 extends longitudinally in a distal direction from double acting hydraulic cylinder 14, alongside and parallel to a path of blade 12. In one embodiment, tool 10 may include two guide arms 16, 18, disposed on opposite sides of blade 12. First guide arm 16 and second guide arm 18 each include a first track 17 and a second track 19, respectively, on an inner surface thereof to guide blade 12 during operation of tool 10.

During operation of tool 10, blade 12 slides along first and second tracks 17, 19 in guide arms 16, 18, keeping blade 12 normal to the location of the intended cut, similar to a guillotine. First and second guide arms 16, 18 may each have a hole through a distal end thereof, into which pin member 20 may be inserted. In one embodiment, pin member 20 is a separately formed piece; in other embodiments, pin member 20 may be integral with one or both of first and second guide arms 16, 18. Pin member 20 removably connects the distal ends of first and second guide arms 16, 18 to one another.

Tool 10 may further include stabilizing plate 21, affixed to each of first and second guide arms 16, 18. Stabilizing plate 21 contributes to maintaining a desired spacing between first and second guide arms 16, 18 to allow blade 12 to operate between guide arms 16, 18, and to allow the coils 22, 24 to be secured between guide arms 16, 18.

First and second guide arms 16, 18 are spaced from one another such that a pair of coils 22, 24 fit between first and second guide arms 16, 18 with a first coil 22 disposed distally of a second coil 24 in the pair. Coils 22, 24 may be, in one embodiment, end windings. Typically, coils 22, 24 may be made of copper or other conductive material. In various embodiments, coils 22, 24 may be substantially rectangular in cross-section, and may be stacked and insulated. In one embodiment, each coil 22, 24 in the pair may be between about 1.27 cm (about 0.5 inch) and about 3.5 cm (about 1.5 inch) thick. The pair of coils 22, 24 may collectively be about 11.4 cm (about 4.5 inches) in total height, therefore, the distance along first and second guide arms 16, 18 between a distal edge of stabilizing plate 21 and pin member 20 must be at least about 11.4 cm.

Blade 12 may be coupled to double acting hydraulic cylinder 14 by a shaft 26. A connector member 28 may further be disposed between double acting hydraulic cylinder 14 and the blade 12. Connector member 28 may be substantially annular in shape, having a hole therein through which shaft 26 passes. First and second guide arms 16, 18 may further be affixed to connector member 28 by, e.g., bolts or other fasteners. In one embodiment, connector member 28 is threaded on a proximal end, and double acting hydraulic cylinder 14 is threaded on a distal end. Connector member 28 and double acting hydraulic cylinder 14 may thus be threadably connected to one another, i.e., threaded onto one another.

Blade 12 and first and second guide arms 16, 18 may be made of steel. In one embodiment, blade 12 may be made of S7 tool steel. Operation of tool 10 may provide a force of about 20.68 mPa (about 3,000 psi) over an area of about 20.65 cm$^2$ (about 3.2 in$^2$).

Figure 2:
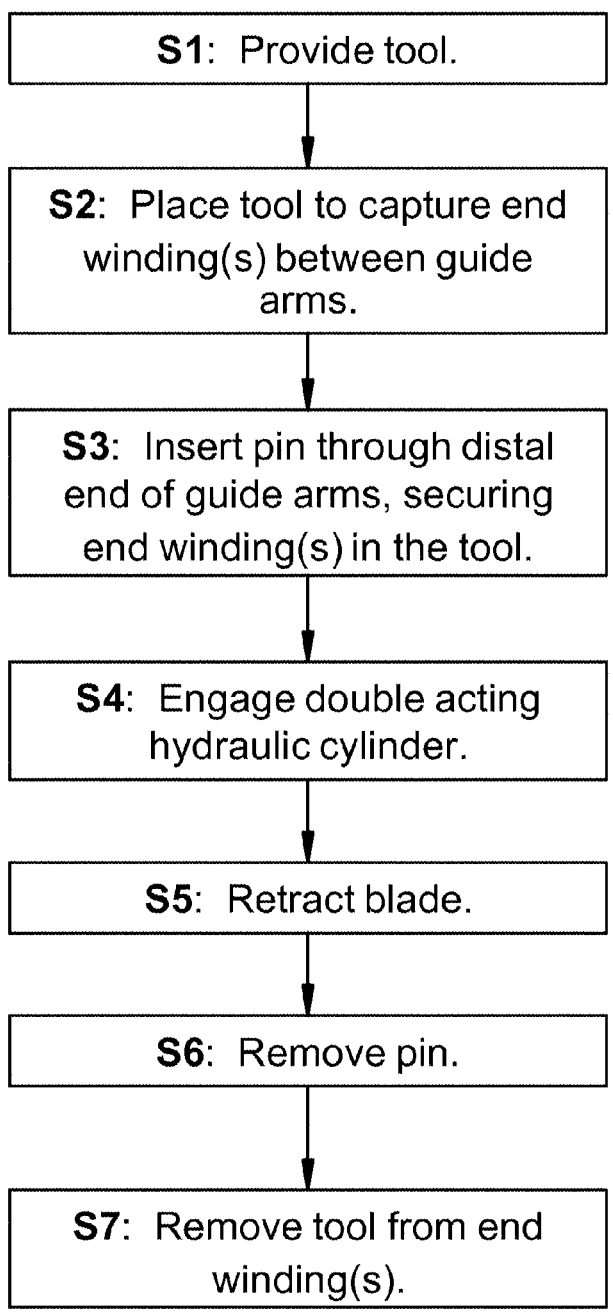
FIG. 2 shows a method in accordance with an embodiment of the invention.

Also provided is a method of cutting a pair of coils 22, 24. Turning to FIG. 2, in step S1, tool 10 is provided as described above. Tool 10 includes blade 12 having a sharp cutting edge 14 on a distal end thereof, and double acting hydraulic cylinder 14 operably connected to a proximal end of blade 12. At least a first guide arm 16, or, as in the embodiment shown in FIG. 1, pair of first and second guide arms 16, 18, is connected to double acting hydraulic cylinder 14 and extends longitudinally in a distal direction therefrom. First guide arm 16 and, if present, second guide arm 18, are disposed alongside blade 12, and extend parallel to a path of blade 12. In one embodiment, blade 12 and first and second guide arms 16, 18 may be made of steel.

In step S2, tool 10 may be placed about the coils 22, 24 such that the pair of coils 22, 24 are captured between the pair of first and second guide arms 16, 18. coils 22, 24 are disposed such that coil 22 is distal of coil 24.

In step S3, pin member 20 may be inserted distal of coils 22, 24, through holes 30, 32 in first and second guide arms 16, 18. Thus, pin member 20 captures coils 22, 24 in tool 10, bounded by guide arms 16, 18, pin member 20, and stabilizing plate 21/blade 12. Each of the pair of coils 22, 24 may be between about 1.27 cm to about 3.5 cm thick, and the pair of coils 22, 24 may collectively be about 11.4 cm in total height.

In step S4, tool 10 is actuated by engaging double acting hydraulic cylinder 14. As blade 12 shears through first coil 24 and then coil 22 in a single stroke, performing the cuts, pin member 20 takes the reaction load. In one embodiment, the stroke may take about 21 seconds to cut both of coils 22, 24. The force provided by double acting hydraulic cylinder 14 may be about 20.68 mPa (about 3,000 psi) over an area of about 20.65 cm$^2$ (about 3.2 in$^2$).

Once the cut is made, blade 12 is retracted in step S5, and in step S6, pin member 20 is removed from first and second guide arms 16, 18. In an embodiment, the method may be practice in the space of about 90 seconds. Tool 10, which may be handheld and portable, is then removed from coils 22, 24 in step S7, and is ready to be used on a subsequent pair of coils or a single coil.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tool comprising:
   a blade having a cutting edge on a distal end thereof;
   a double acting hydraulic cylinder operably connected to a proximal end of the blade; and
   a pair of guide arms connected to and extending longitudinally in a distal direction from the double acting hydraulic cylinder,
      wherein each guide arm in the pair of guide arms is disposed alongside the blade and extends parallel to a path of the blade, each guide arm in the pair of guide arms being disposed on opposite sides of the blade, and
      wherein each guide arm in the pair of guide arms includes a track dimensioned to accommodate an edge of the blade, the track being disposed on a surface of the guide arm facing the blade, such that the blade slides longitudinally in the tracks in each of the pair of guide arms, and
      wherein a first guide arm in the pair of guide arms has a first hole through a distal end thereof, and a second guide arm in the pair of guide arms has a second hole through a distal end thereof; and
   a pin member positioned within the first hole and the second hole such that the pin member is removably connected to both the first guide arm and the second guide arm.

2. The tool of claim 1, further comprising a stabilizing plate affixed to each of the pair of guide arms for maintaining a distance between the pair of guide arms.

3. The tool of claim 2, wherein the distance between the pair of guide arms accommodates a pair of end windings of a dynamoelectric machine, the pair of end windings being disposed such that a first end winding is distal of a second end winding, and the pair of end windings are disposed between the pair of guide arms.

4. The tool of claim 3, wherein each of the first and the second end windings has a cross sectional width of between about 1.27 cm and about 3.5 cm.

5. The tool of claim 1, further comprising a shaft coupling the blade to the double acting hydraulic cylinder.

6. The tool of claim 5, further comprising a connector member disposed between the double acting hydraulic cylinder and the blade, the connector member including a hole therein through which the shaft passes, wherein the pair of guide arms are affixed to the connector member.

7. The tool of claim 6, wherein the connector member is threaded on a proximal end, and the double acting hydraulic cylinder is threaded on a distal end, and the connector member and the double acting hydraulic cylinder are threadably connected.

8. The tool of claim 1, wherein the blade further comprises steel, and wherein the pair of guide arms comprises steel.

9. The tool of claim 1, wherein actuation of the tool provides a force of about 20.68 mPa over an area of about 20.65 $cm^2$.

* * * * *